(12) United States Patent
Jamalimehr et al.

(10) Patent No.: US 12,276,357 B2
(45) Date of Patent: Apr. 15, 2025

(54) TRANSPORTING EQUIPMENT AND INDIVIDUALS WITHIN A CONDUIT AND/OR A PIPELINE

(71) Applicants: Amin Jamalimehr, Isfahan (IR); Mohamad Ali Soleimani, Tehran (IR); Ashkan Sohbatloo, Tehran (IR); Farshad Fadakar Kourkah, Tehran (IR); Seyd Hossein Mousavi, Tehran (IR); Saed Khansari, Tehran (IR); Mohammad Durali, Tehran (IR)

(72) Inventors: Amin Jamalimehr, Isfahan (IR); Mohamad Ali Soleimani, Tehran (IR); Ashkan Sohbatloo, Tehran (IR); Farshad Fadakar Kourkah, Tehran (IR); Seyd Hossein Mousavi, Tehran (IR); Saed Khansari, Tehran (IR); Mohammad Durali, Tehran (IR)

(73) Assignees: Durali System Design & Automation Co. (IR); Sharif University of Technology (IR)

( * ) Notice: Subject to any disclaimer, the term of this patent is extended or adjusted under 35 U.S.C. 154(b) by 174 days.

(21) Appl. No.: 18/100,121

(22) Filed: Jan. 23, 2023

(65) Prior Publication Data

US 2023/0160498 A1 May 25, 2023

Related U.S. Application Data

(63) Continuation-in-part of application No. 17/316,301, filed on May 10, 2021, now Pat. No. 11,559,948,
(Continued)

(51) Int. Cl.
*E02B 9/06* (2006.01)
*E21B 19/02* (2006.01)
(Continued)

(52) U.S. Cl.
CPC .............. *F16L 1/036* (2013.01); *E21B 19/02* (2013.01); *F16L 1/06* (2013.01)

(58) Field of Classification Search
CPC .. F16L 1/036; F16L 1/06; E21B 19/02; E21B 19/06; E21B 19/07
See application file for complete search history.

(56) References Cited

U.S. PATENT DOCUMENTS 3,768,267 A * 10/1973 Chlumecky ............. E21D 11/05
405/152
4,270,876 A * 6/1981 Eklund ..................... E21D 5/12
405/133
(Continued)

FOREIGN PATENT DOCUMENTS

CN 111455945 A * 7/2020 ............... E02B 9/00

*Primary Examiner* — Benjamin F Fiorello

(57) ABSTRACT

A system for transporting equipment and individuals within a conduit and/or a pipeline. The system includes a ground floor, a first floor, a connecting rod, an ovality compensation mechanism, a couple of holding arms at a top end of the system, and a winch. The ground floor and the first floor are configured to receive and keep an operator onto them. The ovality compensation mechanism is attached to a lower side of the first floor by utilizing a couple of connecting chains. The ovality compensation mechanism is configured to increase a diameter of a pipe segment of the pipeline.

12 Claims, 16 Drawing Sheets

Related U.S. Application Data which is a continuation of application No. 16/522,085, filed on Jul. 25, 2019, now Pat. No. 11,001,010.

(60) Provisional application No. 62/702,929, filed on Jul. 25, 2018.

(51) Int. Cl.
*F16L 1/036* (2006.01)
*F16L 1/06* (2006.01)

(56) References Cited

U.S. PATENT DOCUMENTS

| | | | | |
|---|---|---|---|---|
| 4,473,322 A | * | 9/1984 | Echols | E21D 5/04 |
| | | | | 405/133 |
| 11,001,010 B2 | * | 5/2021 | Durali | B66C 1/14 |
| 2022/0307373 A1 | * | 9/2022 | Volkers | E21C 41/24 |

* cited by examiner

100

```
┌─────────────────────────────────────────────┐
│ Securing a first pipe segment of the        │
│ pipeline at a top end of the conduit.       │──102
└─────────────────────────────────────────────┘
                      ↓
┌─────────────────────────────────────────────┐
│ Aligning a main axis of a second pipe       │
│ segment of the pipeline with a main axis    │──104
│ of the pipeline.                            │
└─────────────────────────────────────────────┘
                      ↓
┌─────────────────────────────────────────────┐
│ Lifting the second pipe segment from a      │
│ first position associated with a bottom     │
│ end of the conduit to a second position     │──106
│ adjacent to the first pipe segment.         │
└─────────────────────────────────────────────┘
                      ↓
┌─────────────────────────────────────────────┐
│ Abutting a top rim of the second pipe       │
│ segment against a bottom rim of the         │──108
│ first pipe segment.                         │
└─────────────────────────────────────────────┘
                      ↓
┌─────────────────────────────────────────────┐
│ Attaching the top rim of the second pipe    │
│ segment to the bottom rim of the first      │──110
│ pipe segment.                               │
└─────────────────────────────────────────────┘
```

FIG. 1

TRANSPORTING EQUIPMENT AND INDIVIDUALS WITHIN A CONDUIT AND/OR A PIPELINE

CROSS-REFERENCE TO RELATED APPLICATION

This application is a continuation-in-part of U.S. patent application Ser. No. 17/316,301, filed May 10, 2021, and entitled "LIFTING MECHANISM FOR LIFTING A PIPE SEGMENT IN A CONDUIT" which is a continuation of U.S. patent application Ser. No. 16/522,085, filed Jul. 25, 2019, and entitled "INSTALLING PIPELINE SEGMENTS WITHIN A CONDUIT" which takes priority from U.S. Provisional Patent Application Ser. No. 62/702,929, and entitled "NEW METHOD AND APPARATUS FOR INSTALLATION OF VERTICAL PENSTOCK IN HYDRO POWER PLANT" which are all incorporated herein by reference in their entirety.

TECHNICAL FIELD

The present disclosure generally relates to pipeline installation, and particularly to a method for installing a pipeline within a conduit.

BACKGROUND

Installing large-diameter pipelines, such as those used as penstocks of hydropower plants, requires special equipment and joint efforts of many workers. Different systems and methods may be utilized for installing inclined or vertical large-diameter pipelines. For example, in a pipeline installation method for installing large-diameter pipe segments of a penstock of a hydropower plant, installation of pipe segments may be carried out from a bottom end of the penstock toward a top end of the penstock. In this method, first a pipe segment may be installed at the bottom end of the penstock and then other pipe segments may be fed into the penstock from the top end of the penstock. Each subsequent pipe segment may be lowered down into the penstock from the top end toward the bottom end of the penstock and then may be attached on a top rim of a previously installed pipe segment.

Installing an inclined or vertical penstock may require installing pipe segments within an inclined or vertical conduit or well, which may have been dug before installing the pipe segments. Utilizing a bottom-up method as described above may require first installing a pipe segment at a bottom end of the conduit or well and then feeding other subsequent pipelines from a top end of the well towards the bottom end of the conduit or well. Each pipe segment may then be welded onto a top rim of a previously installed pipe segment. This bottom-up installation method may be associated with serious risks for the workers and for the equipment. For example, rock fractures that may have been created on an inner surface of the conduit or well during the dig or water penetration into the conduit or the well may lead to rocks being detached from an inner surface of the conduit or well and fall freely into the conduit or well. This dangerous falling of rocks is referred to herein as rockfall. In a bottom-up method, workers are exposed to the rockfall within previously installed pipe segments, increasing the risks to workers in utilizing this approach.

One way to address the issue of rockfall is to consolidate an inner wall of the conduit or well before installation of a pipeline within the conduit or well. However, consolidating the inner wall of the conduit may be expensive and time-consuming. There is, therefore, a need for a fast and safe pipeline installation method for installing pipe segments within an inclined or vertical conduit.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments, the present disclosure describes a system for transporting equipment and individuals within a conduit and/or a pipeline. In an exemplary embodiment, the system may include a ground floor, a first floor, a connecting rod, an ovality compensation mechanism, a couple of holding arms, and a winch.

In an exemplary embodiment, the ground floor may include a first circular disk. In an exemplary embodiment, the ground floor may be configured to receive and keep an operator onto an upper side of the ground floor. In an exemplary embodiment, the first floor may include a second circular disk. In an exemplary embodiment, the first floor may be configured to receive and keep the operator onto an upper side of the first floor. In an exemplary embodiment, a main plane of the ground floor may be parallel to a main plane of the first floor.

In an exemplary embodiment, the connecting rod may be interconnected between the ground floor and the first floor. In an exemplary embodiment, a first end of the connecting rod may be attached to a center of the upper side of the ground floor. In an exemplary embodiment, a second end of the connecting rod may be attached to a center of the lower side of the first floor. In an exemplary embodiment, a main longitudinal axis of the connecting rod may be perpendicular to the main plane of the ground floor and the main plane of the first floor.

In an exemplary embodiment, the ovality compensation mechanism may be attached to a lower side of the first floor by utilizing a couple of connecting chains. In an exemplary embodiment, the ovality compensation mechanism may be configured to increase a diameter of a pipe segment of the pipeline. In an exemplary embodiment, the ovality compensation mechanism may include a base, a first arm, a first end plate, a second arm, a second end plate, a moveable arm, and a hydraulic jack.

In an exemplary embodiment, the base may include a ring-shaped frame and a hole. In an exemplary embodiment, the hole may be provided in the ring-shaped frame. In an exemplary embodiment, the connecting rod may be disposed inside the hole. In an exemplary embodiment, the first arm may be attached from a proximal end of the first arm to a first end of the base.

In an exemplary embodiment, the first end plate fixedly attached to a distal end of the first arm. In an exemplary embodiment, the first end plate may be configured to be in contact with an inner surface of a pipe segment and apply pressure to the inner surface of the pipe segment in a first direction.

In an exemplary embodiment, the second arm may be attached from a proximal end of the second arm to a second end of the base. In an exemplary embodiment, the second arm may include a hollow beam. In an exemplary embodiment, the second end plate may movably be attached to a distal end of the second arm. In an exemplary embodiment, the second end plate may be configured to be in contact with the inner surface of the pipe segment and apply pressure to the inner surface of the pipe segment in a second direction. In an exemplary embodiment, the first direction may be opposite to the second direction.

In an exemplary embodiment, a proximal end of the moveable arm may be disposed slidably inside the second arm. In an exemplary embodiment, the second end plate may be attached fixedly to a distal end of the moveable arm. In an exemplary embodiment, the hydraulic jack may be disposed inside the second arm. In an exemplary embodiment, the hydraulic jack may be connected to the proximal end of the moveable arm. In an exemplary embodiment, the hydraulic jack may be configured to urge the moveable arm to move linearly inside the second arm.

In an exemplary embodiment, responsive to moving the second plate in the second direction, the first end plate and the second end plate may be configured to increase a diameter of the pipe segment by applying pressure to the inner surface of the pipe segment at opposite ends of the diameter of the pipe segment.

In an exemplary embodiment, the couple of holding arms may be provided at a top end of the system. In an exemplary embodiment, the couple of holding arms may be configured to be attached to a winch. In an exemplary embodiment, the winch may be configured to ascend and/or descend the system within the conduit.

In an exemplary embodiment, the winch mechanism may be attached to the lower side of the first floor. In an exemplary embodiment, the couple of connecting chains may be connected to the winch mechanism. In an exemplary embodiment, the winch mechanism may be configured to move up and/or move down the ovality compensation mechanism along a vertical axis. In an exemplary embodiment, the main longitudinal axis of the connecting rod may coincide the vertical axis.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 illustrates a method for installing a pipeline within a conduit, consistent with one or more exemplary embodiments of the present disclosure;

DETAILED DESCRIPTION

Figure 2A:
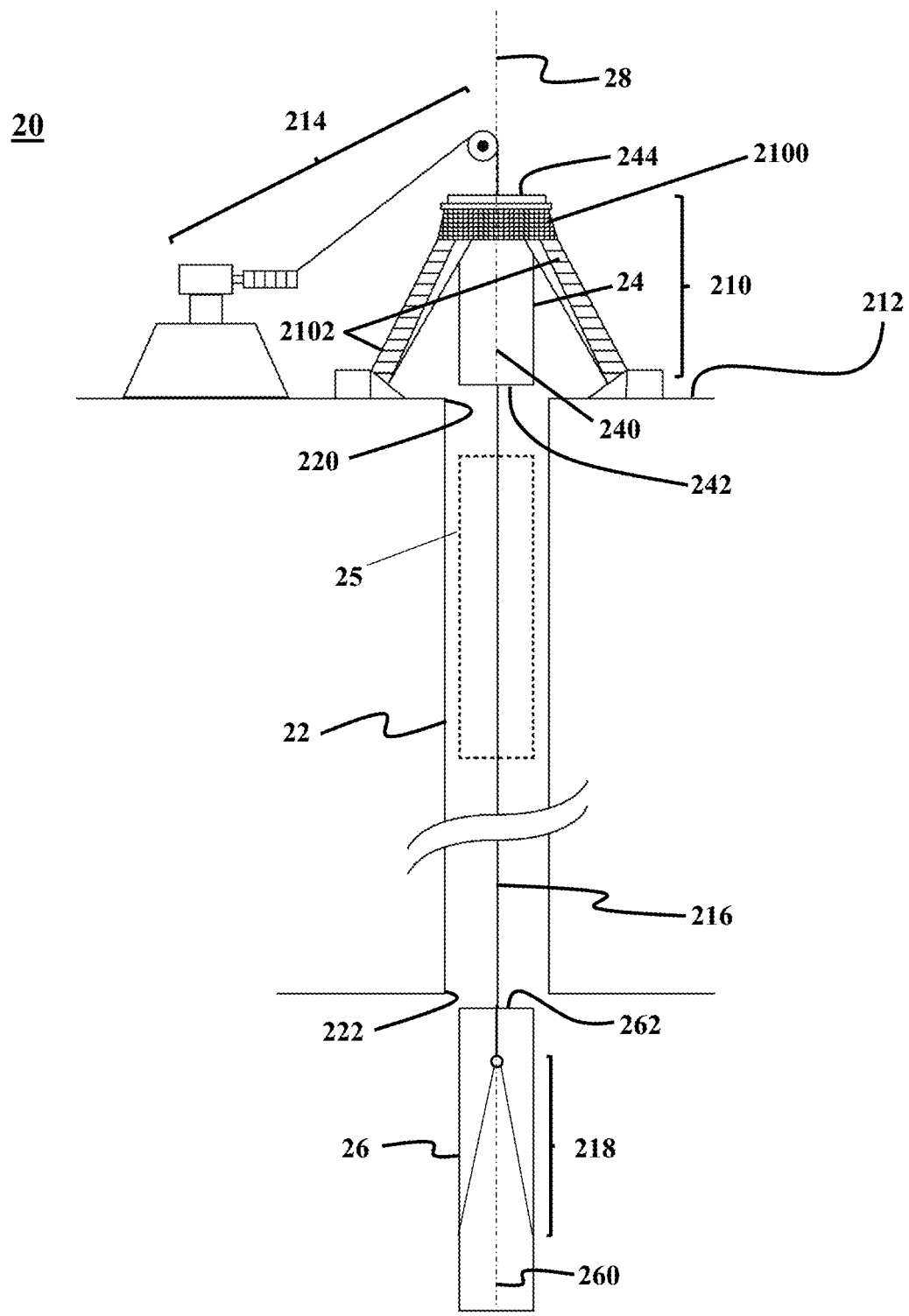
FIG. 2A illustrates a schematic side view of a system for installing a pipeline within a conduit, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure is directed to exemplary systems and exemplary methods for installing a pipeline, such as a penstock of a hydropower plant, within a conduit or well. In traditional methods for installing a penstock of a hydropower plant, pipe segments are installed from a bottom end of the penstock toward a top end of the penstock. In this method, each pipe segment is attached on a top rim of a previously installed pipe segment. However, when an exemplary penstock needs to be installed within an exemplary inclined conduit or well, as mentioned in preceding sections, rockfall within an exemplary inclined conduit or well may pose serious risks for any workers and for the equipment. According to one or more exemplary embodiments, an exemplary system and method for installing a pipeline within an inclined or vertical conduit or well may allow for installing pipe segments from a top end of the conduit or well instead of a bottom end of the conduit or well. In exemplary embodiments, installing pipe segments from a top end of the conduit and then welding subsequent pipe segments to a lower rim of a previously installed pipe segment, may allow for the workers and equipment to be within a previously installed pipe segment while attaching and welding a subsequent pipe segment bellow the previously installed pipe segment. Therefore, a previously installed pipe segment may provide a protective shield against rockfall within a conduit or well, within which the exemplary pipeline is being installed.

In further detail, in an exemplary method for installing a pipeline within an exemplary inclined or vertical conduit may allow for installing a first pipe segment at a top end of an exemplary conduit and then attaching other subsequent pipe segment bellow the exemplary first pipe segment. In exemplary embodiments, each subsequent pipe segment may be fed into an exemplary conduit from a bottom end of the conduit and then it may be lifted toward a lower rim of a previously installed pipe segment, where it may be welded to the previously installed pipe segment by the workers who are accommodated within the previously installed pipe segment. Therefore, the workers are protected against any possible rockfall within the conduit.

FIG. 1 illustrates a method 100 for installing a pipeline within a conduit, consistent with one or more exemplary embodiments of the present disclosure. In an exemplary embodiment, method 100 may include a step 102 of securing a first pipe segment of the pipeline at a top end of the conduit, a step 104 of aligning a main axis of a second pipe segment of the pipeline with a main axis of the pipeline, a step 106 of lifting the second pipe segment from a first position associated with a bottom end of the conduit to a second position adjacent to a lower rim of the first pipe segment, a step 108 of abutting a top rim of the second pipe segment against the bottom rim of the first pipe segment, and a step 110 of attaching the top rim of the second pipe segment to the bottom rim of the first pipe segment. In an exemplary embodiment, an exemplary pipeline may include a plurality of pipe segments between the first pipe segment and the second pipe segment. In an exemplary embodiment, steps 102 to 110 of method 100 may be repeated for a plurality of pipe segments as described below.

In an exemplary embodiment, a main axis of each subsequent pipe segment may be aligned with a main axis of a previously installed pipe segment, each subsequent pipe segment may be lifted from a first position associated with a bottom end of the conduit to a second position adjacent to a lower rim of a previously installed pipe segment, a top rim of each subsequent pipe segment may be abutted against a lower rim of a previously installed pipe segment, and a top rim of each subsequent pipe segment may be attached to a lower rim of a previously installed pipe segment.

FIG. 2A illustrates a schematic side view of a system 20 for installing a pipeline within a conduit 22, consistent with one or more exemplary embodiments of the present disclosure. In an exemplary embodiment, system 20 may include a hanger structure 210 that may be mounted at atop end 220 of conduit 22. In an exemplary embodiment, hanger structure 210 may include a collar 2100 and a plurality of legs 2102 that may be interconnected between collar 2100 and a ground 212 surrounding a periphery of top end 220 of conduit 22. In an exemplary embodiment, plurality of legs 2102 may include a first leg 2102a, a second leg 2102b, and a third leg 2102c. In an exemplary embodiment, a main axis 2104 of collar 2100 may be aligned with a main axis 28 (overlapping main axis 2104 of collar 2100) of the pipeline. In an exemplary embodiment, plurality of legs 2102 may maintain the main axis of collar 2100 aligned with main axis 28 of the pipeline.

In an exemplary embodiment, step 102 of securing a first pipe segment of the pipeline at a top end of the conduit may include securing a first pipe segment of the pipeline at a top end of the conduit by coupling the top end of the first pipe segment with a collar of a hanger structure. For example, first pipe segment 24 may be secured at top end 220 of conduit 22 by coupling a top end 244 of first pipe segment 24 to collar 2100 of hanger structure 210 such that a main axis 240 of first pipe segment 24 may coincide main axis 28 of the pipe line.

In an exemplary embodiment, system 20 may further include a lifting mechanism that may include a winch 214 that may be coupled to a second pipe segment 26 utilizing a lifting assembly 218. Lifting assembly 218 may be disposed within a second pipe segment 26 and be connected to an inner surface of second pipe segment 26. In an exemplary embodiment, lifting assembly 218 may be connected to winch 214 utilizing a main cable 216. In an exemplary embodiment, step 106 of lifting the second pipe segment from a first position associated with a bottom end of the conduit to a second position adjacent to a lower rim of the first pipe segment may include lifting the second pipe segment utilizing a winch connected to a lifting assembly disposed within the second pipe segment. For example, winch 214 may be connected through main cable 216 to second pipe segment 26 utilizing lifting assembly 218. In an exemplary embodiment, winch 214 may be utilized for lifting second pipe segment 26 from a first position associated with a bottom end 222 of conduit 22 to a second position adjacent to first pipe segment 24 as shown by first broken lines 25.

Figure 2B:
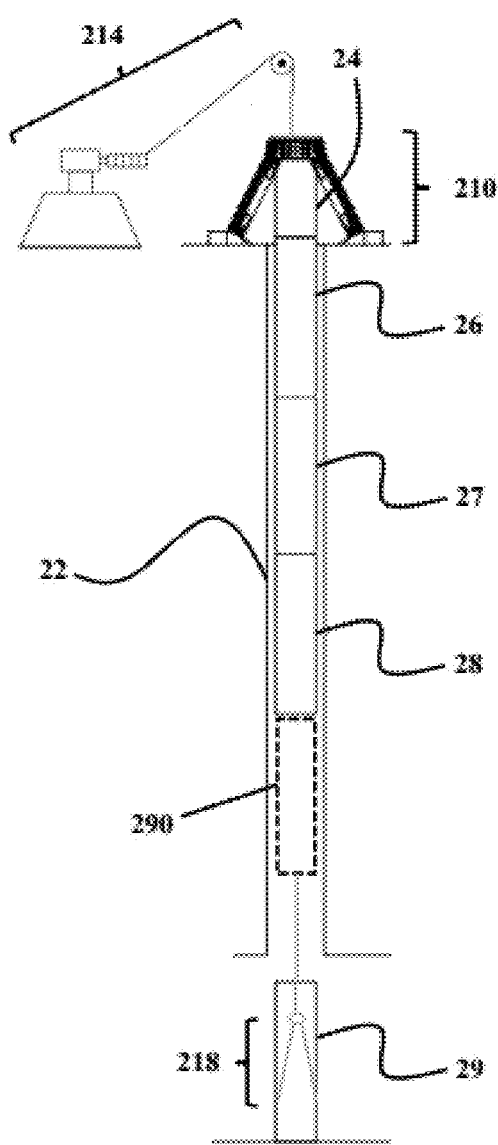
FIG. 2B illustrates a schematic side view of a system for installing a pipeline within a conduit, consistent with one or more exemplary embodiments of the present disclosure.

In an exemplary embodiment, a number of pipe segments of the pipeline may be installed. Then, in an exemplary embodiment, system 20 may be utilized for installing a subsequent pipe segment. FIG. 2B illustrates a schematic side view of system 20 for installing a pipeline within conduit 22, consistent with one or more exemplary embodiments of the present disclosure. For example, as shown in FIG. 2B, some exemplary pipe segments such as first pipe segment 24, second pipe segment 26, a third pipe segment 27, and a fourth pipe segment 28 may be installed inside conduit 22. Then, in an exemplary embodiment, winch 214 may be connected through main cable 216 to a fifth pipe segment 29 utilizing lifting assembly 218. In an exemplary embodiment, winch 214 may be utilized for lifting fifth pipe segment 29 from the first position associated with bottom end 222 of conduit 22 to a third position adjacent to fourth pipe segment 28 as shown by second broken lines 290. In an exemplary embodiment, it may be understood that winch 214 may be connected through main cable 216 to an exemplary pipe segment utilizing lifting assembly 218 and winch 214 may be utilized for lifting the exemplary pipe segment from the first position associated with bottom end 222 of conduit 22 to a position adjacent to a previously installed pipe segment.

Figure 3:
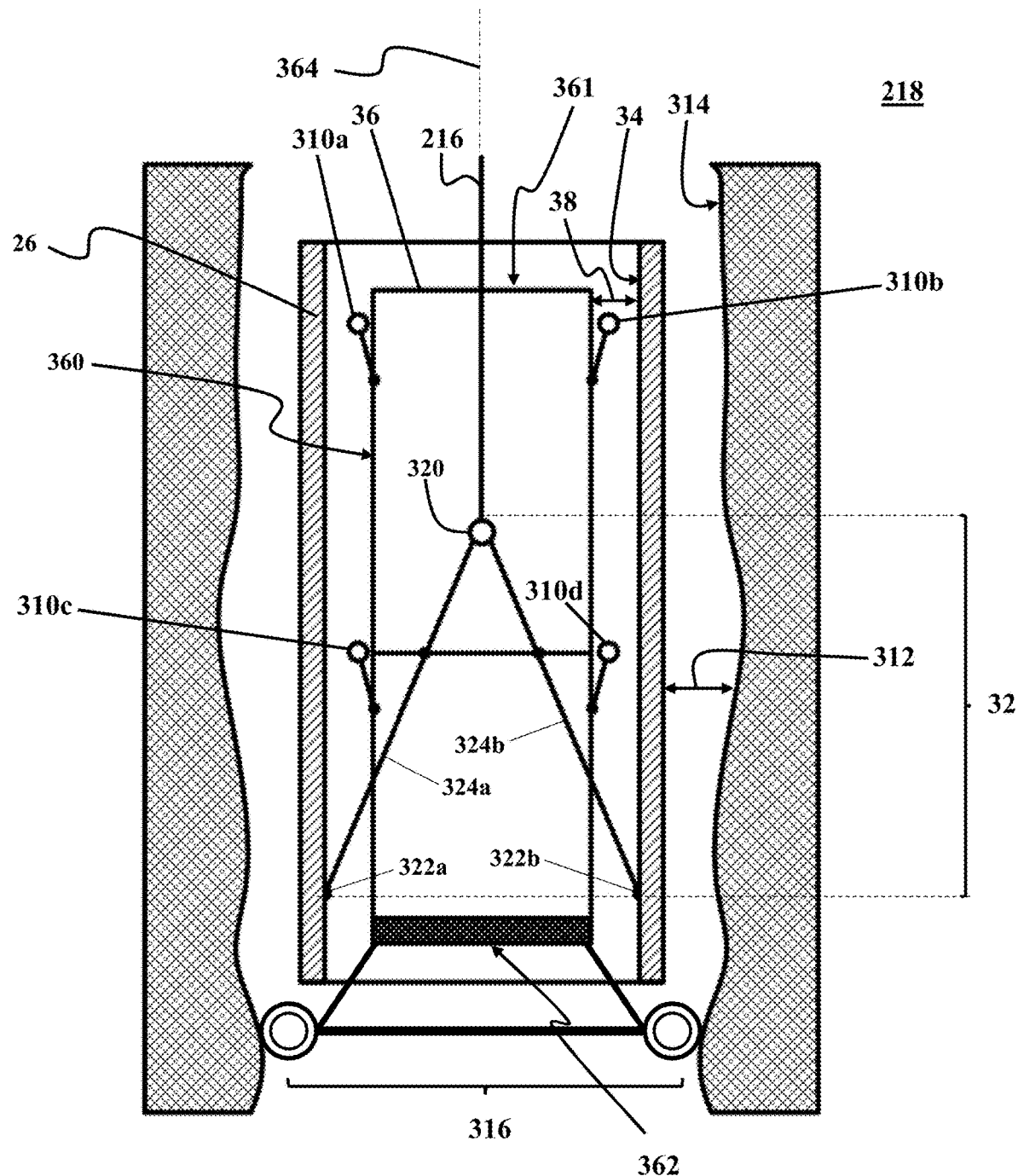
FIG. 3 illustrates a schematic side view of a lifting assembly, consistent with one or more exemplary embodiments of the present disclosure.

FIG. 3 illustrates a schematic side view of lifting assembly 218, consistent with one or more exemplary embodiments of the present disclosure. In an exemplary embodiment, lifting assembly 218 may include a chain sling 32 that may be connected to an inner surface 34 of a pipe segment, such as second pipe segment 26. In an exemplary embodiment, chain sling 32 may be coupled to a cylindrical frame 36. In an exemplary embodiment, chain sling 32 may include a main hook 320, a plurality of connecting hooks 322a-b that may be connected to inner surface 34 of second pipe segment 26, and a plurality of chains 324a-b that may interconnect plurality of connecting hooks 322a-b and main hook 320. In an exemplary embodiment, winch 214 may be connected to main hook 320 utilizing main cable 216. In an exemplary embodiment, lifting second pipe segment 26 may include winding up main cable 216 utilizing winch 214.

Figure 4:
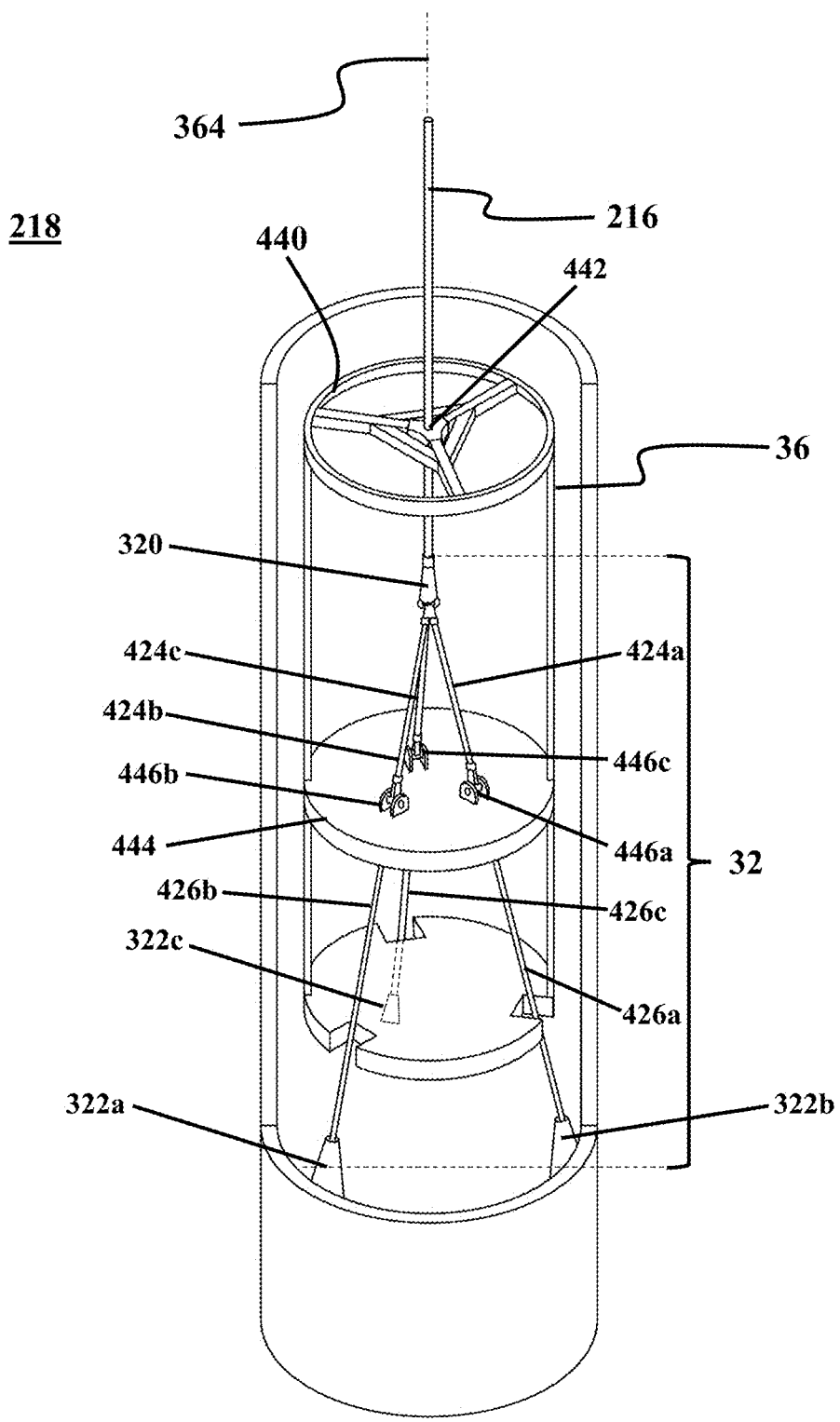
FIG. 4 illustrates a sectional perspective view of a lifting assembly, consistent with one or more exemplary embodiments of the present disclosure.

In an exemplary embodiment, lifting the second pipe segment may further include maintaining an alignment between the main axis of the second pipe segment and the main axis of the pipeline utilizing the lifting assembly. For example, lifting assembly 218 may be utilized to maintain an alignment between main axis 260 of second pipe segment 26 and main axis 28 of the pipeline. FIG. 4 illustrates a sectional perspective view of lifting assembly 218, consistent with one or more exemplary embodiments of the present disclosure. As shown in FIG. 4, in an exemplary embodiment, cylindrical frame 36 may be coaxially disposed within a pipe segment, such as second pipe segment 26. In an exemplary embodiment, maintaining an alignment between the main axis of the second pipe segment and the main axis of the pipeline may include maintaining a first gap between an outer surface of the cylindrical frame and an inner surface of the second pipe segment constant by extending a plurality of retractable wheels between the outer surface of the cylindrical frame and the inner surface of the second pipe segment. For example, as shown in FIG. 3, a plurality of retractable wheels including first retractable wheel 310a, second retractable wheel 310b, third retractable wheel 310c, and fourth retractable wheel 310d, may be extended between outer surface 360 of cylindrical frame 36 and inner surface 34 of second pipe segment 26, and, to thereby, a first gap 38 between outer surface 360 of cylindrical frame 36 and inner surface 34 of second pipe segment 26 may be maintained constant.

As further shown in FIG. 4, in an exemplary embodiment, chain sling 32 may include a first plurality of chains 424a-c and a second plurality of chains 426a-c. In an exemplary embodiment, first plurality of chains 424a-c and second plurality of chains 426a-c may interconnect plurality of connecting hooks 322a-b and main hook 320. In an exemplary embodiment, each of first plurality of chains 424a-c may be connected to a middle platform 444 of cylindrical frame 36. In an exemplary embodiment, each of first plurality of chains 424a-c may be connected to middle platform 444 utilizing a plurality of shackles 446a-c. For example, first chain 424a from first plurality of chains may be connected to middle platform 444 utilizing first shackle 446a.

In an exemplary embodiment, second plurality of chains 426a-c may also be connected to middle platform 444 of cylindrical frame 36. In an exemplary embodiment, each of second plurality of chains 426a-c may be connected to middle platform 444 utilizing plurality of shackles 446a-c. For example, fourth chain 446a from second plurality of chains may be connected to middle platform 444 utilizing first shackle 446a.

Furthermore, as shown in FIG. 4, in an exemplary embodiment, cylindrical frame 36 may include a central hole 442 at a center of a top end 440 of cylindrical frame 36. In an exemplary embodiment, main cable 216 may be passed through central hole 442. It may be understood that passing main cable 216 through central hole 442 may help cylindrical frame 36 to maintain its stability during moving up and down inside an exemplary conduit for example conduit 22.

Figure 5A:
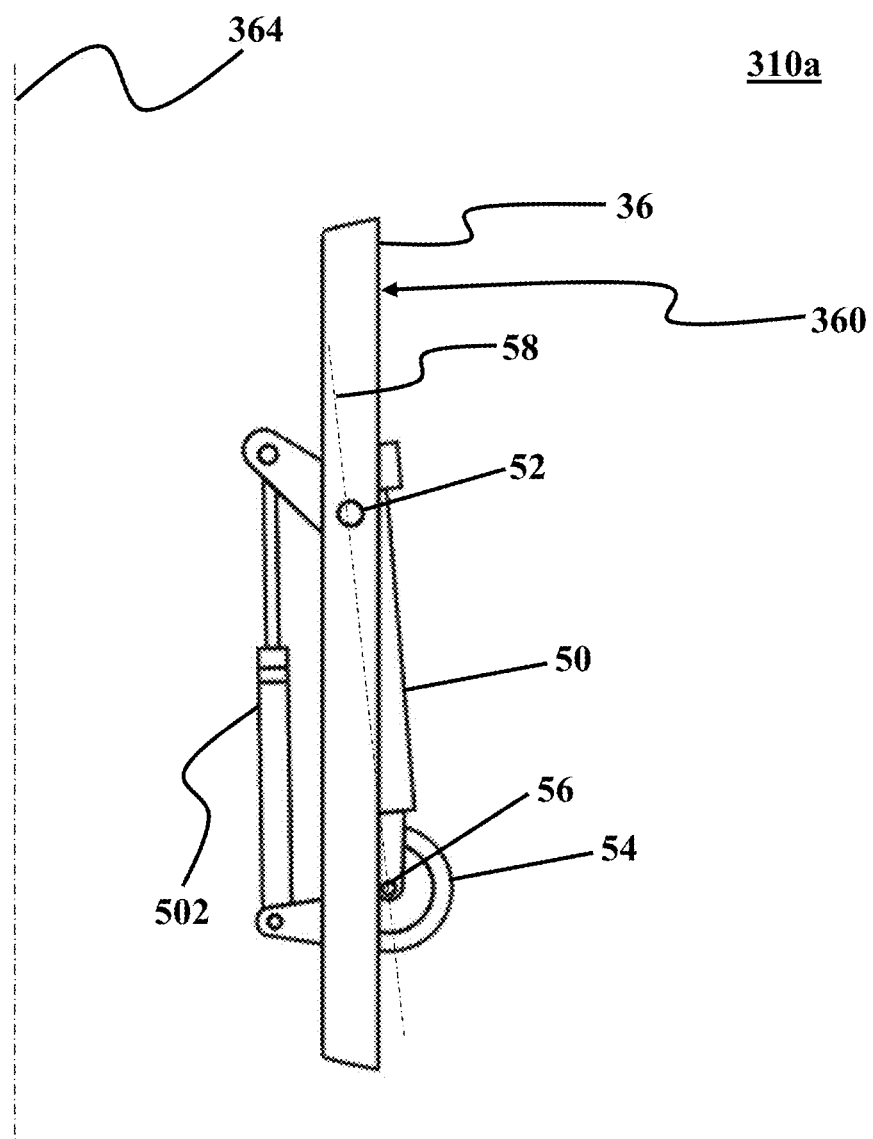
FIG. 5A illustrates side view of a retractable wheel in a retracted position, consistent with one or more exemplary embodiments of the present disclosure.
Figure 5B:
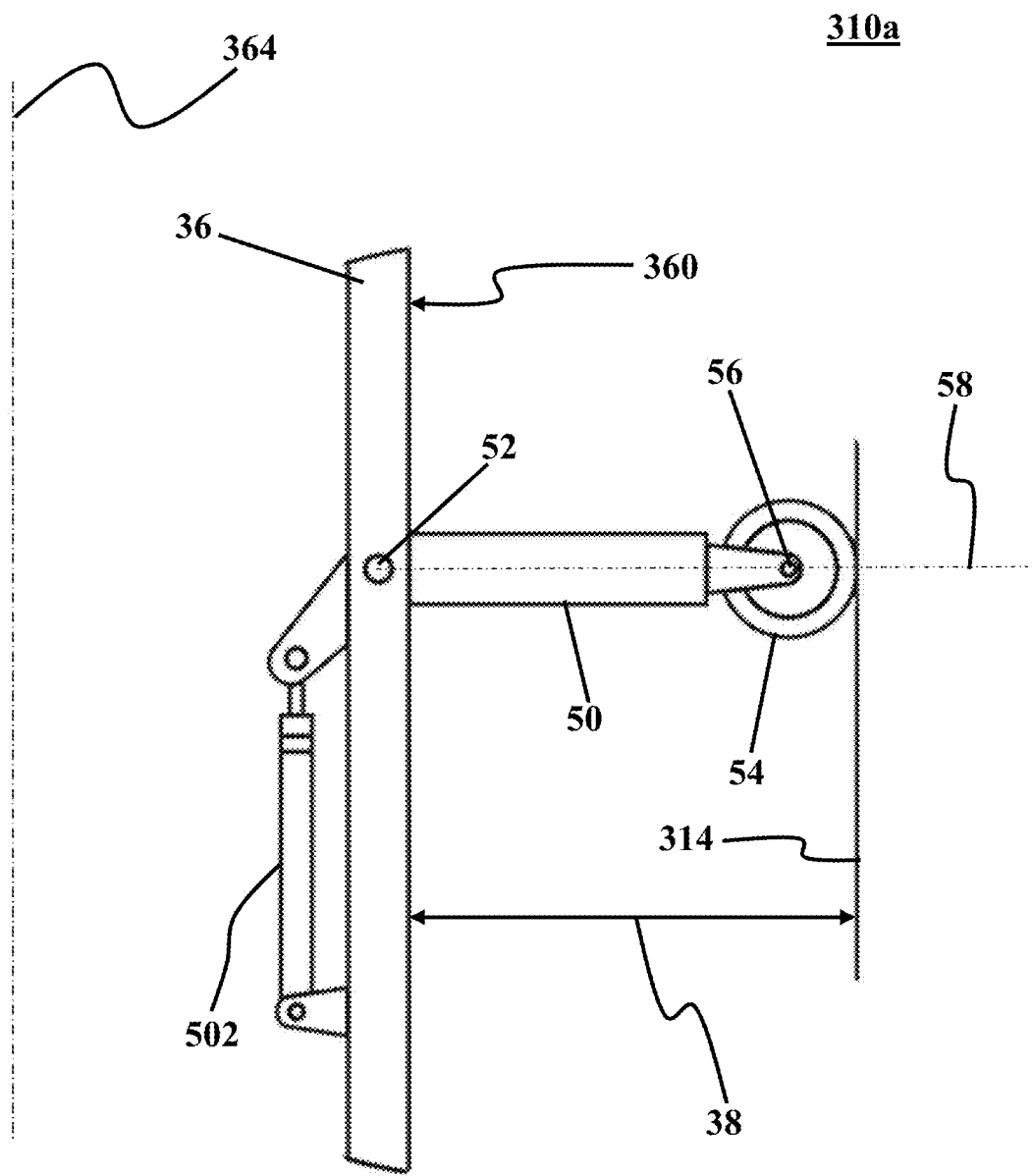
FIG. 5B illustrates side view of a retractable wheel in an extended position, consistent with one or more exemplary embodiments of the present disclosure.

FIG. 5A illustrates side view of an exemplary retractable wheel from the plurality of retractable wheels in a retracted position, consistent with one or more exemplary embodiments of the present disclosure and FIG. 5B illustrates side view of an exemplary retractable wheel from the plurality of retractable wheels in an extended position, consistent with one or more exemplary embodiments of the present disclosure In an exemplary embodiment, each retractable wheel from the plurality of retractable wheels may include a retractable arm that may be pivotally coupled to outer surface 360 of cylindrical frame 36 from a first end of the retractable arm. Furthermore, each retractable wheel from the plurality of retractable wheels may include a wheel that may be rotatably coupled to a second opposing end of the retractable arm. For example, as shown in FIG. 5A and FIG. 5B, first retractable wheel 310a may include a retractable arm 50 that may be pivotally coupled to outer surface 360 of cylindrical frame 36 from a first end 51 of retractable arm 50. In an exemplary embodiment, first retractable wheel 310a may further include a wheel 54. In an exemplary embodiment, wheel 54 may be rotatably coupled to a second opposing end 53 of retractable arm 50. In an exemplary embodiment, as shown in FIG. 5A, first retractable wheel 310a may be in a retracted position when a main axis 58 of retractable arm 50 is substantially parallel to a main axis 364 of cylindrical frame 36. It may be understood that the term "substantially parallel" may be intended to mean parallel or nearly parallel. In an exemplary embodiment, main axis 58 of retractable arm 50 is substantially parallel to main axis 364 of cylindrical frame 36 when an angle between main axis 58 of retractable arm 50 and main axis 364 of cylindrical frame 36 is less than, for example, 20°. In an exemplary embodiment, as shown in FIG. 5B, first retractable wheel 310a may be in an extended position when a main axis 58 of retractable arm 50 is substantially perpendicular to a main axis 364 of cylindrical frame 36. It may be understood that the term "substantially perpendicular" may be intended to mean perpendicular or nearly perpendicular. In an exemplary embodiment, main axis 58 of retractable arm 50 is substantially perpendicular to main axis 364 of cylindrical frame 36 when an angle between main axis 58 of retractable arm 50 and main axis 364 of cylindrical frame 36 is between, for example, 80° and 100°.

In an exemplary embodiment, as shown in FIG. 5A and FIG. 5B, retractable arm 50 may be connected pivotally to cylindrical frame 36 utilizing a fourth pivot 52. In an exemplary embodiment, wheel 54 may be connected pivotally to retractable arm 50 utilizing a sixth pivot 56. In an exemplary embodiment, it may be understood that second retractable wheel 310b, third retractable wheel 310c, and fourth retractable wheel 310d may be substantially analogous to first retractable wheel 310a in structure and functionality. As shown in FIG. 3, in an exemplary embodiment, first retractable wheel 310a and second retractable wheel 310b may be connected to outer surface 360 of cylindrical frame 36 at a position near to a top end 361 of cylindrical frame 36. In an exemplary embodiment, third retractable wheel 310c and fourth retractable wheel 310d may be connected to outer surface 360 of cylindrical frame 36 at a position near to a bottom end 361 of cylindrical frame 36.

In an exemplary embodiment, extending the plurality of retractable wheels between the outer surface of the cylindrical frame and the inner surface of the second pipe segment may include pivotally rotating the retractable arm from a retracted position to an extended position. For example, in order to extend the plurality of retractable wheels between outer surface 360 of cylindrical frame 36 and inner surface 34 of second pipe segment 26, retractable arm 50 may be rotated around fourth pivot 52 from the retracted position to the extended position. In an exemplary embodiment, retractable arm 50 may be coupled to a first actuator 502, for example, a first hydraulic jack. In an exemplary embodiment, first actuator 502 may be configured to actuate retractable arm 50 to rotate around fourth pivot 52. In an exemplary embodiment, the plurality of retractable wheels may be equally spaced apart around a periphery of outer surface 360 of cylindrical frame 36.

In an exemplary embodiment, maintaining an alignment between a main axis of the second pipe segment and a main axis of the pipeline may further include maintaining a second gap between an outer periphery of a bottom end of the cylindrical frame and an inner surface of the conduit constant by extending a retractable mechanism between the outer periphery of the bottom end of the cylindrical frame and the inner surface of the conduit. For example, as shown in FIG. 3, in an exemplary embodiment, a retractable mechanism 316 may be extended between an outer periphery of bottom end 362 of cylindrical frame 36 and inner surface 314 of conduit 22 to maintain a second gap 312 between the outer periphery of bottom end 362 of cylindrical frame 36 and inner surface 314 of conduit 22.

Figure 6A:
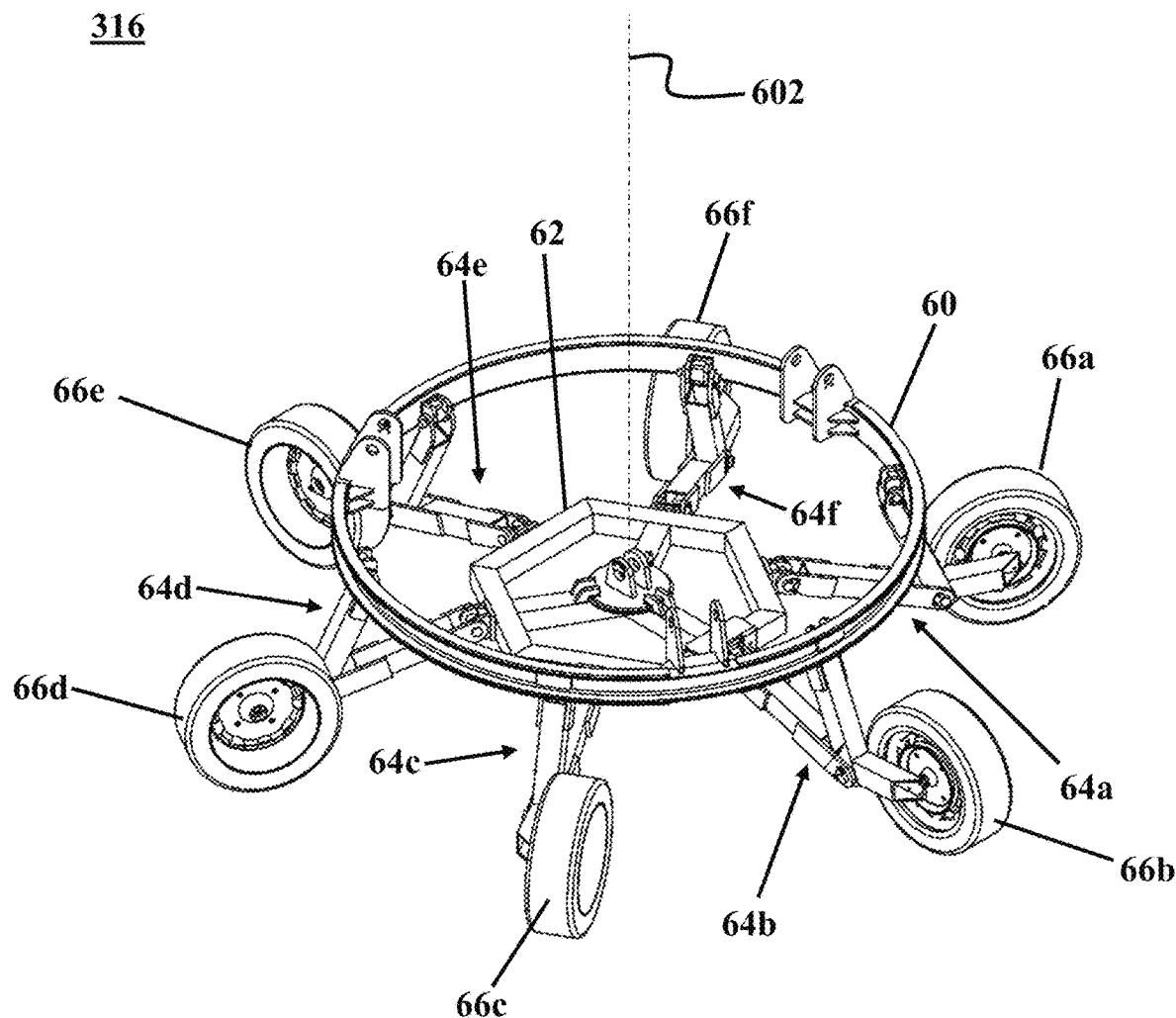
FIG. 6A illustrates a perspective view of a retractable mechanism, consistent with one or more exemplary embodiments of the present disclosure.

FIG. 6A illustrates a perspective view of a retractable mechanism 316, consistent with one or more exemplary embodiments of the present disclosure. As shown in FIG. 6A, in an exemplary embodiment, retractable mechanism 316 may include a main frame 60 that may be fixedly attached to cylindrical frame 36. In an exemplary embodiment, cylindrical frame 36 may include a ring shape. In an exemplary embodiment, retractable mechanism 316 may further include a secondary frame 62. In an exemplary embodiment, secondary frame 62 may include a hexagonal shape. In an exemplary embodiment, retractable mechanism 316 may further include a plurality of two-link mechanisms such as a first two-link mechanism 64a, a second two-link mechanism 64b, a third two-link mechanism 64c, a fourth two-link mechanism 64d, a fifth two-link mechanism 64e, and a sixth two-link mechanism 64f. In an exemplary embodiment, the plurality of two-link mechanisms may interconnect main frame 60 and secondary frame 62. In an exemplary embodiment, retractable mechanism 316 may further include a plurality of wheels such as a first wheel 66a, a second wheel 66b, a third wheel 66c, a fourth wheel 66d, a fifth wheel 66e, and a sixth wheel 66f.

Figure 6B:
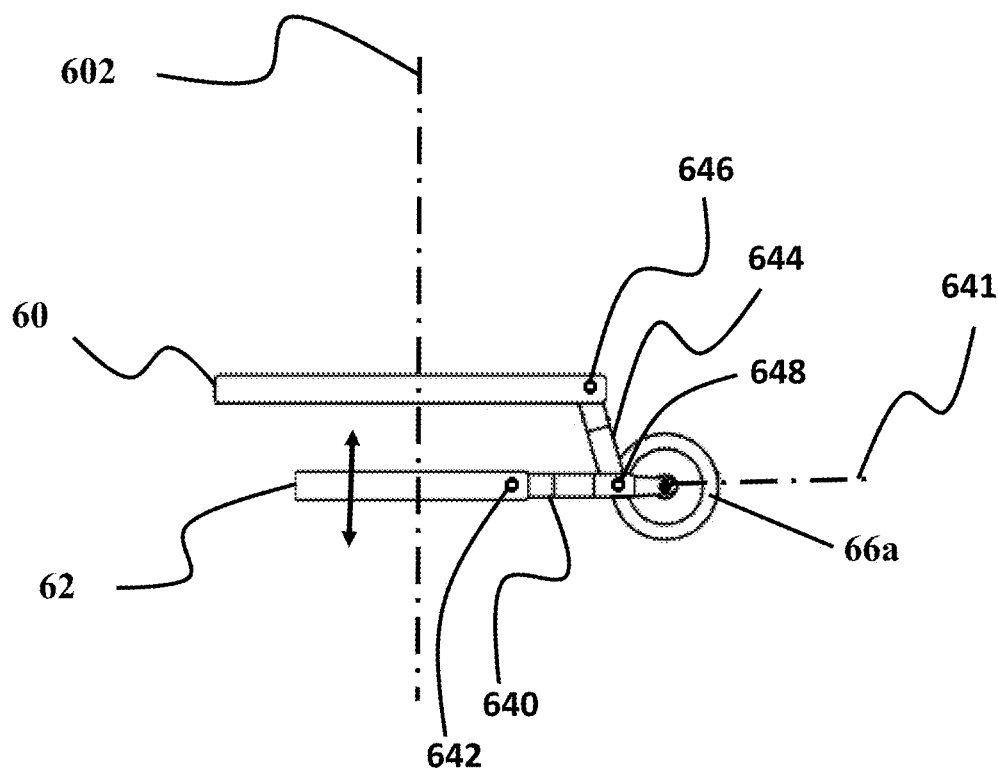
FIG. 6B illustrates a side view of a two-link mechanism in an extended position, consistent with one or more exemplary embodiments of the present disclosure.
Figure 6C:
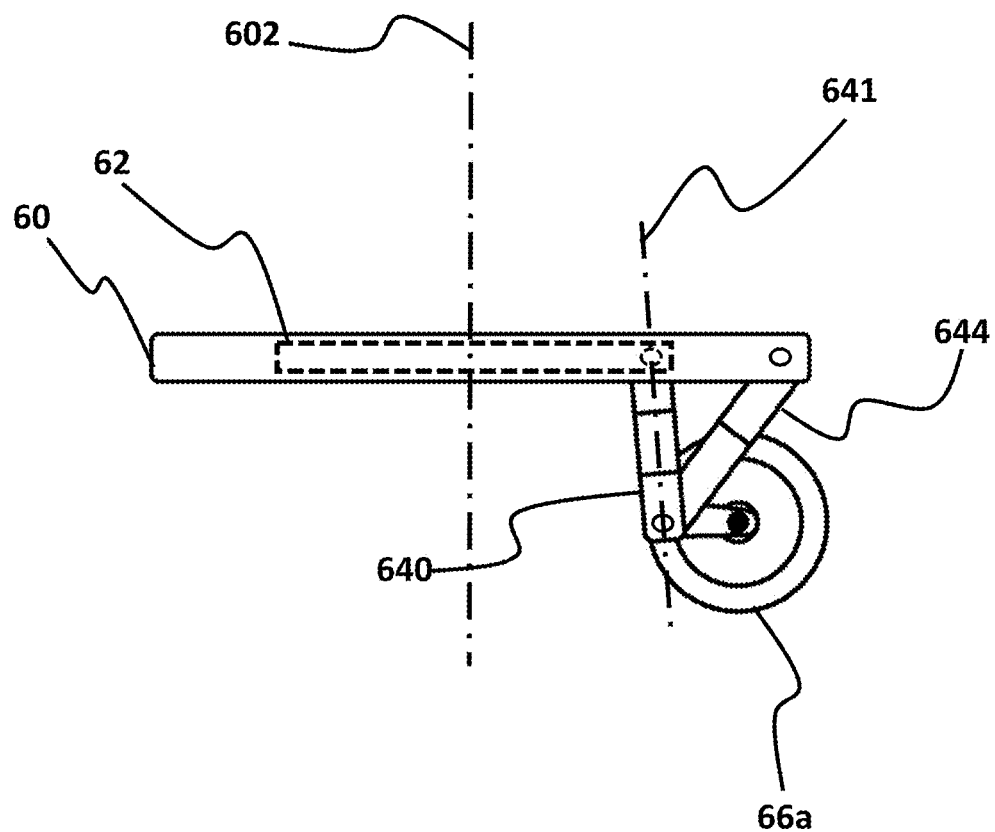
FIG. 6C illustrates a side view of a two-link mechanism in a retracted position, consistent with one or more exemplary embodiments of the present disclosure.

In an exemplary embodiment, each two-link mechanism of the plurality of two-link mechanisms may include a first link pivotally coupled to the secondary frame utilizing a first pivot joint. Each two-link mechanism of the plurality of two-link mechanisms may further include a second link pivotally coupled to the main frame utilizing a second pivot joint. In an exemplary embodiment, the second link and the first link may be interconnected utilizing a third pivot joint. FIG. 6B illustrates a side view of first two-link mechanism 64a in an extended position, consistent with one or more exemplary embodiments of the present disclosure. FIG. 6C illustrates a side view of first two-link mechanism 64a in a retracted position, consistent with one or more exemplary embodiments of the present disclosure. As shown in FIG. 6B and FIG. 6C, in an exemplary embodiment, first two-link mechanism 64a may include a first link 640 that may be pivotally coupled to secondary frame 62 utilizing a first pivot joint 642. First two-link mechanism 64a may further include a second link 644 pivotally coupled to main frame 60 utilizing a second pivot joint 646. In an exemplary embodiment, second link 644 and first link 640 may be interconnected utilizing a third pivot joint 648.

As shown in FIG. 6B, when first two-link mechanism 64a is in the extended position, a main axis 641 of first link 640 may be substantially perpendicular to main axis 602 of main frame 60. It may be understood that the term "substantially perpendicular" may be intended to mean perpendicular or nearly perpendicular. In an exemplary embodiment, main axis 641 of first link 640 is substantially perpendicular to main axis 602 of main frame 60 when an angle between main axis 641 of first link 640 and main axis 602 of main frame 60 is between, for example, 80° and 100°.

As shown in FIG. 6C, when first two-link mechanism 64a is in the retracted position, a main axis 641 of first link 640 may be substantially parallel to main axis 602 of main frame 60. It may be understood that the term "substantially parallel" may be intended to mean parallel or nearly parallel. In an exemplary embodiment, main axis 641 of first link 640 is substantially parallel to main axis 602 of main frame 60 when an angle between main axis 641 of first link 640 and main axis 602 of main frame 60 is less than, for example, 20°.

As shown in FIG. 6A, in an exemplary embodiment, each wheel of the plurality of wheels may be connected to a respective third pivot joint of a respective two-link mechanism. Each wheel may rotate around a respective second pivot joint in response to linearly moving the secondary frame along a main axis 602 of main frame 60. For example, as shown in FIG. 6B and FIG. 6C, in an exemplary embodiment, first wheel 66a may be connected fixedly to third pivot joint 648. In an exemplary embodiment, first wheel 66a may rotate around second pivot joint 646 responsive to linearly moving secondary frame 62 along main axis 602 of main frame 60.

In an exemplary embodiment, secondary frame 62 may be coupled to a second actuator, for example a second hydraulic jack. The second actuator may be configured to actuate secondary frame 62 to move linearly along main axis 602 of main frame 60.

In an exemplary embodiment, extending retractable mechanism 316 between the outer periphery of bottom end 362 of cylindrical frame 36 and inner surface 314 of conduit 22 may include extending each wheel of the plurality of wheels from a retracted position to an extended position by moving secondary frame 62 along main axis 602 of main frame 60. For example, secondary frame 62 may be moved downwardly along main axis 602 of main frame 60 to extend first wheel 66a from the retracted position to the extended position. Also, secondary frame 62 may be moved upwardly along main axis 602 of main frame 60 to retract first wheel 66a from the extended position to the retracted position.

Referring back to FIG. 2A, in an exemplary embodiment, abutting a top rim of the second pipe segment against a bottom rim of the first pipe segment may include abutting a top rim 262 of second pipe segment 26 to a bottom rim 242 of first pipe segment 24. In an exemplary embodiment, abutting a top rim 262 of second pipe segment 26 to a bottom rim 242 of first pipe segment 24 may include adjusting a shape and a size of top rim 262 of second pipe segment 26 to a shape and a size of bottom rim 242 of first pipe segment 24 through hammering an internal side of top rim 262 of second pipe segment 26 and internal side of bottom rim 242 of first pipe segment 24. In an exemplary embodiment, attaching the top rim of the second pipe segment to the bottom rim of the first pipe segment may include welding a top rim 262 of second pipe segment 26 to a bottom rim 242 of first pipe segment 24. It may be understood that, in an exemplary embodiment, after that an exemplary pipe segment lifted up to a position adjacent to a previously installed pipe segment, a top rim of the exemplary pipe segment may be abutted against a bottom rim of the previously installed pipe segment and then the top rim of the exemplary pipe segment may be welded to the bottom rim of the previously installed pipe segment. For example, referring back to FIG. 2B, in an exemplary embodiment, after that fifth pipe segment 29 is lifted up to a position adjacent to fourth pipe segment 28 as shown by second broken lines 290, a top rim of fifth pipe segment 29 may be abutted against a bottom rim of fourth pipe segment 28 and then the top rim of fifth pipe segment 29 may be welded to the bottom rim of fourth pipe segment 28.

In an exemplary embodiment, after that first pipe segment 24 is mounted onto collar 2100 of hanger structure 210, each pipe segment may be lifted up to a position adjacent to a previously installed pipe segment and then a top rim of the pipe segment may be abutted against a bottom rim of the previously installed pipe segment and then the top rim of the pipe segment may be welded against a bottom rim of the previously installed pipe segment. These steps may be repeated for all pipe segments of the pipeline in order to complete the pipeline installation.

Figure 7:
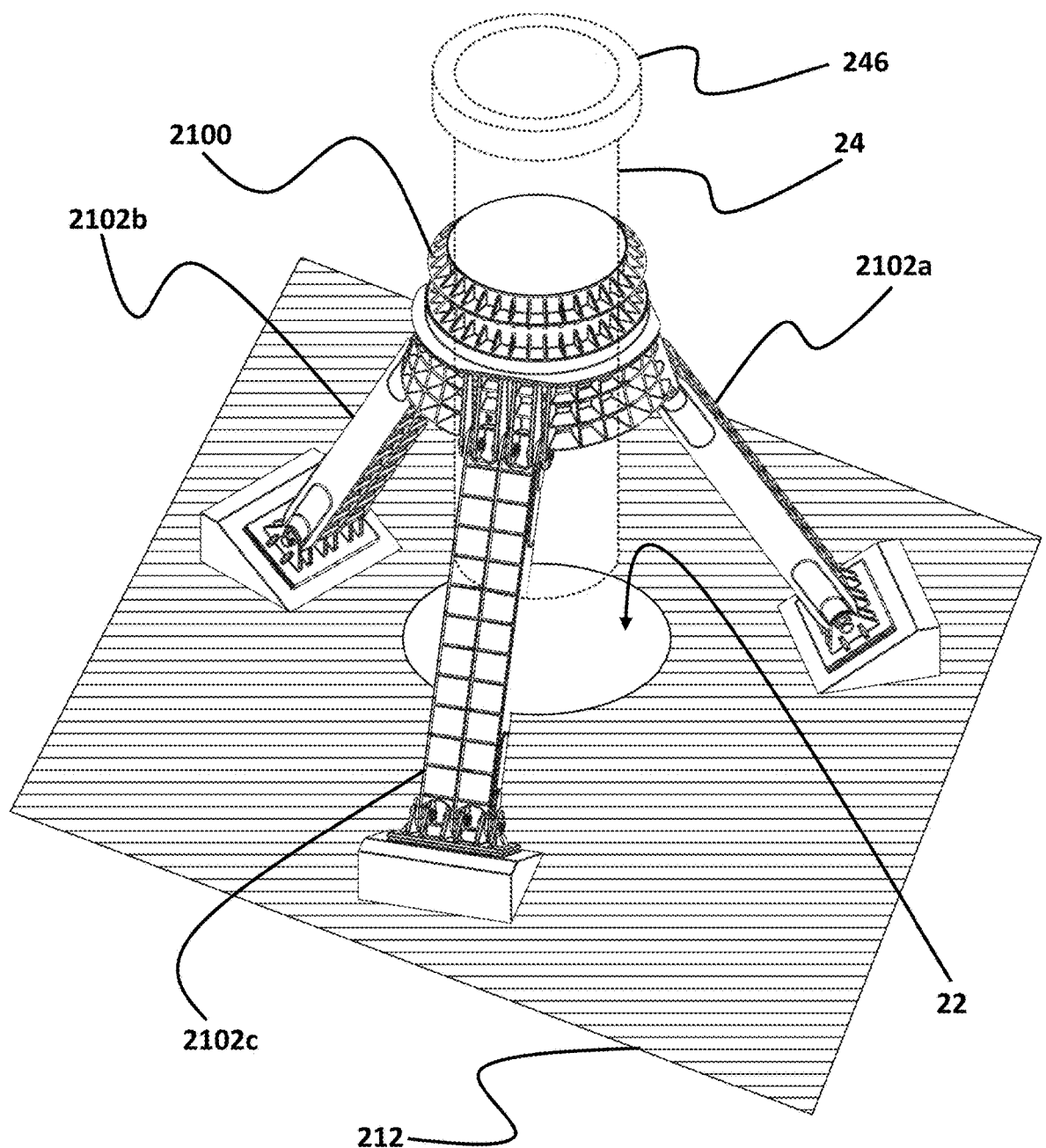
FIG. 7 illustrates a perspective view of a hanger structure, consistent with one or more exemplary embodiments of the present disclosure.

FIG. 7 illustrates a perspective view of a hanger structure, consistent with one or more exemplary embodiments of the present disclosure. As shown in FIG. 7, in an exemplary embodiment, first pipe segment 24 may include a neck segment 246 at top end 244 of first pipe segment 24. In an exemplary embodiment, coupling top end 244 of first pipe segment 24 to collar 2100 of hanger structure 210 may include mounting first pipe segment 24 from neck segment 246 onto collar 2100. In an exemplary embodiment, after installing all pipe segments of the pipeline, first pipe segment 24 and hanger structure 210 may be removed. In an exemplary embodiment, whole of first pipe segment 24 may be removed or otherwise, in an exemplary embodiment, an upper part of first pipe segment 24 may be removed. In an exemplary embodiment, after installing all pipe segments of the pipeline, first pipe segment 24 may be cut from a horizontal section perpendicular to main axis 240 of first pipe segment 24. Then, in an exemplary embodiment, a top part of first pipe segment 24 may be removed from collar 2100 of hanger structure 210. Due to the fact that by removing the top part of first pipe segment 24, the engagement between hanger structure 210 and the pipeline no longer exists, in an exemplary embodiment, after removing first pipe segment 24 from collar 2100 of hanger structure 210, hanger structure 210 may be removed easily.

Figure 8:
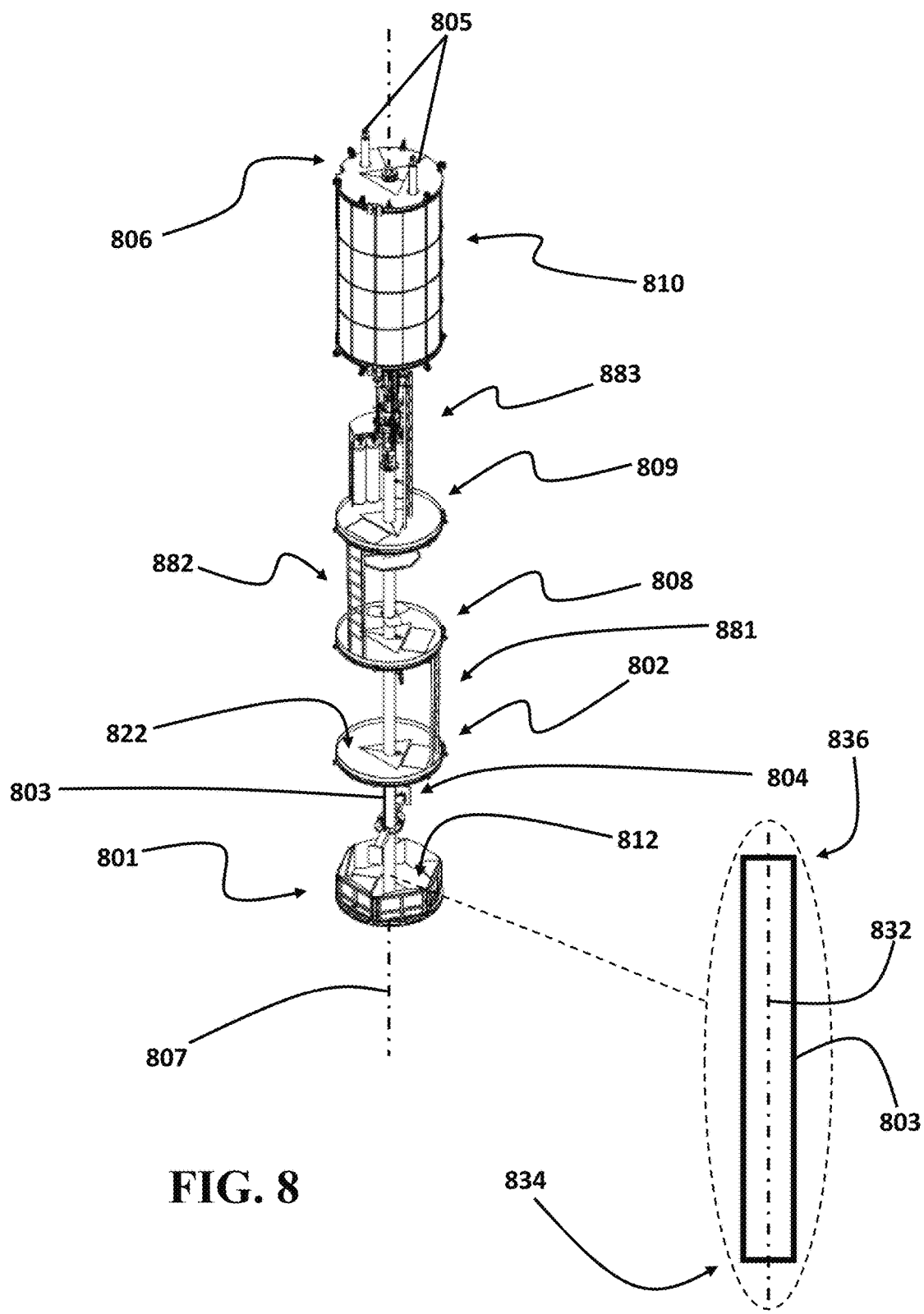
FIG. 8 illustrates a system for transporting equipment and individuals within a conduit and/or a pipeline, consistent with one or more exemplary embodiments of the present disclosure.

FIG. 8 shows a system 800 for transporting equipment and individuals within a conduit and/or a pipeline, consistent with one or more exemplary embodiments of the present disclosure. In an exemplary embodiment, system 800 may include a ground floor 801 and a first floor 802. In an exemplary embodiment, system 800 may further include a second floor 808, a third floor 809, an elevator 810, a first ladder 881, a second ladder 882, and a third ladder 883. In an exemplary embodiment, first ladder 881 may be disposed between first floor 802 and second floor 808. In an exemplary embodiment, second ladder 882 may be disposed between second floor 808 and third floor 809. In an exemplary embodiment, third ladder 883 may be disposed between third floor 809 and elevator 810. In an exemplary embodiment, an exemplary operator may use first ladder 881, second ladder 882, and third ladder 883 to move from one floor to another floor. In an exemplary embodiment, ground floor 801 may be configured to receive and keep an exemplary operator onto an upper side 812 of ground floor 801. In an exemplary embodiment, upper side of ground floor 801 may refer to a side of ground floor 801 that faces toward first floor 802. In an exemplary embodiment, ground floor 801 may include a substantially circular plate. In an exemplary embodiment, an exemplary operator may go onto and stand on the substantially circular plate. In an exemplary embodiment, when an exemplary operator goes onto upper side 812 of ground floor 801 and stands on upper side 812 of ground floor 801, it may mean that ground floor 801 receives and keeps an exemplary operator onto upper side 812 of ground floor 801. In an exemplary embodiment, when an exemplary operator stands on upper side 812 of ground floor 801 and system 800 is within an exemplary pipe segment, the operator may have access to an inner surface of the pipe segment. For example, when an exemplary operator stands on upper side 812 of ground floor 801 and system 800 is within second pipe segment 26, the operator may have access to inner surface 34 of second pipe segment 26. In an exemplary embodiment, system 800 may go up and/or down inside second pipe segment 26 and along a vertical axis 807. the operator may walk around upper side 812 of ground floor 801 so that the operator may have access to different parts of inner surface 34 of second pipe segment 26.

In an exemplary embodiment, first floor 802 may be configured to receive and keep an exemplary operator onto an upper side 822 of first floor 802. In an exemplary embodiment, first floor 802 may include a substantially circular plate. In an exemplary embodiment, an exemplary operator may go onto and stand on the substantially circular plate such as ground floor 801 and first floor 802. In an exemplary embodiment, when an exemplary operator goes onto upper side 822 of first floor 802 and stands on upper side 822 of first floor 802, it may mean that first floor 802 receives and keeps an exemplary operator onto upper side 822 of first floor 802. In an exemplary embodiment, when an exemplary operator stands on upper side 822 of first floor 802 and system 800 is within an exemplary pipe segment, the operator may have access to an inner surface of the pipe segment. For example, when an exemplary operator stands on upper side 822 of first floor 802 and system 800 is within second pipe segment 26, the operator may have access to inner surface 34 of second pipe segment 26. In an exemplary embodiment, system 800 may go up and/or down inside second pipe segment 26 and along vertical axis 807 and the operator may walk around upper side 822 of first floor 802 so that the operator may have access to different parts of inner surface 34 of second pipe segment 26.

In an exemplary embodiment, system 800 may include a couple of holding arms 805 at atop end 806 of system 800. In an exemplary embodiment, holding arms 805 may be connected to an exemplary winch such as winch 214. In an exemplary embodiment, winch 214 may be configured to ascend and/or descend system 800 within the conduit and along vertical axis 807, that is, winch may allow vertical movement of system 800 within the conduit. In an exemplary embodiment, system 800 may further include a connecting rod 803 interconnected between ground floor 801 and first floor 802. In an exemplary embodiment, a main plane of first floor 802 may be parallel to a main plane of ground floor 801. In an exemplary embodiment, a main longitudinal axis 832 of connecting rod 803 may be perpendicular to the main plane of ground floor 801 and the main plane of first floor 802. In an exemplary embodiment, main longitudinal axis 832 of connecting rod 803 may coincide vertical axis 807. In an exemplary embodiment, a bottom end 834 of connecting rod 803 may be attached to a center of upper side 812 of ground floor 801. In an exemplary embodiment, a top end 836 of connecting rod 803 may be attached to a center of lower side 824 of first floor 802. In an exemplary embodiment, system 800 may further include an ovality compensation mechanism 804. In an exemplary embodiment, ovality compensation mechanism 804 may be configured to increase a diameter of an exemplary pipe segment. In an exemplary embodiment, ovality compensation mechanism 804 may be used to compensate for ovality of a pipe segment. In an exemplary embodiment, ovality of a pipe segment may refer to the pipe segment deviation from being cylindrical. In an exemplary embodiment, an exemplary operator may utilize ovality compensation mechanism 804 to increase a diameter of the pipe segment and, to thereby, compensate for an ovality of the pipe segment, that is, compensate shape differences between an exemplary pipe segment and an exemplary preinstalled pipe segment.

Figure 9A:
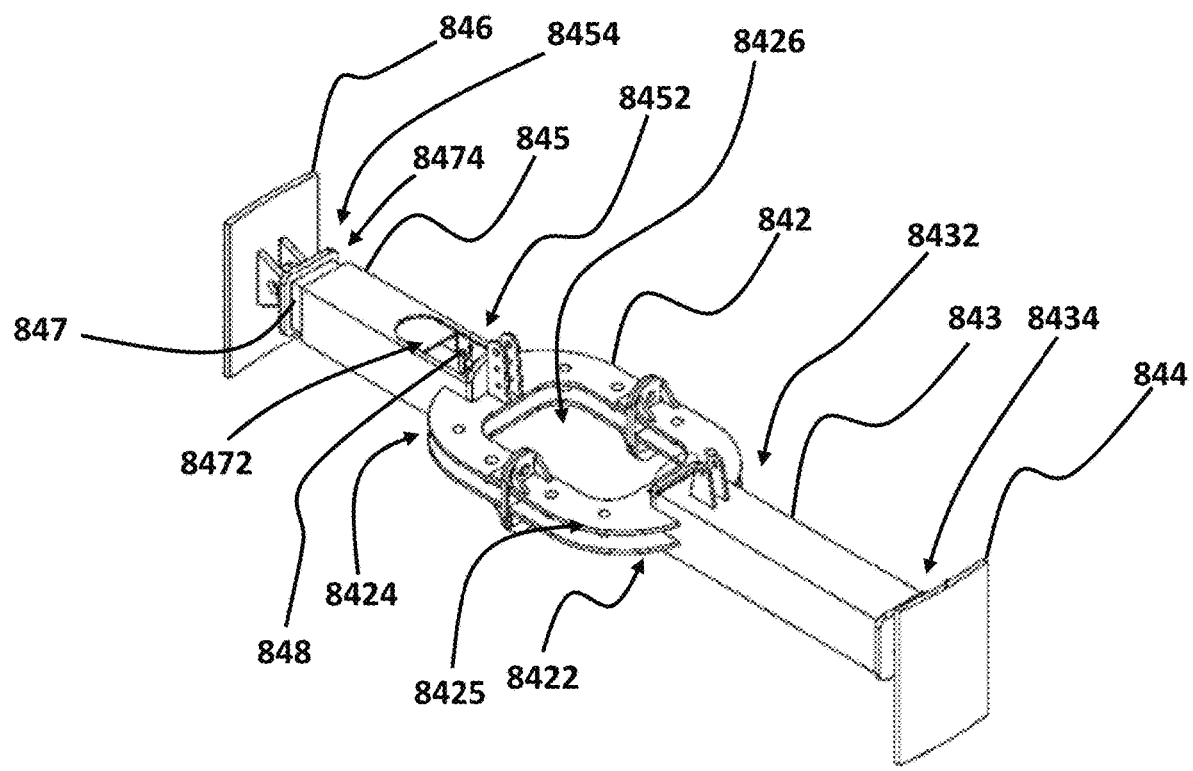
FIG. 9A illustrates an ovality compensation mechanism, consistent with one or more exemplary embodiments of the present disclosure.

FIG. 9A shows ovality compensation mechanism 804, consistent with one or more exemplary embodiments of the present disclosure. As shown in FIG. 9A, in an exemplary embodiment, ovality compensation mechanism 804 may include a base 842, a first arm 843, a first end plate 844, a second arm 845, and a second end plate 846. In an exemplary embodiment, first arm 843 may be attached from a proximal end 8432 of first arm 843 to a first end 8422 of base 842. In an exemplary embodiment, first end plate 844 may be fixedly attached to a distal end 8434 of first arm 843. In an exemplary embodiment, when first end plate 844 is fixedly attached to distal end 8434 of first arm 843, it may mean that first end plate 844 is attached to distal end 8434 of first arm 843 in such a way that any relative movement between first end plate 844 and distal end 8434 of first arm 843 is prevented.

In an exemplary embodiment, second arm 845 may be attached from a proximal end 8452 of second arm 845 to a second end 8424 of base 842. In an exemplary embodiment, second end plate 846 may be movably attached to a distal end 8454 of second arm 845. In an exemplary embodiment, when second end plate 846 is movably attached to distal end 8454 of second arm 845, it may mean that second end plate 846 is attached to distal end 8454 of second arm 845 in such a way that second end plate 846 is able to move relative to distal end 8454 of second arm 845.

Figure 9B:
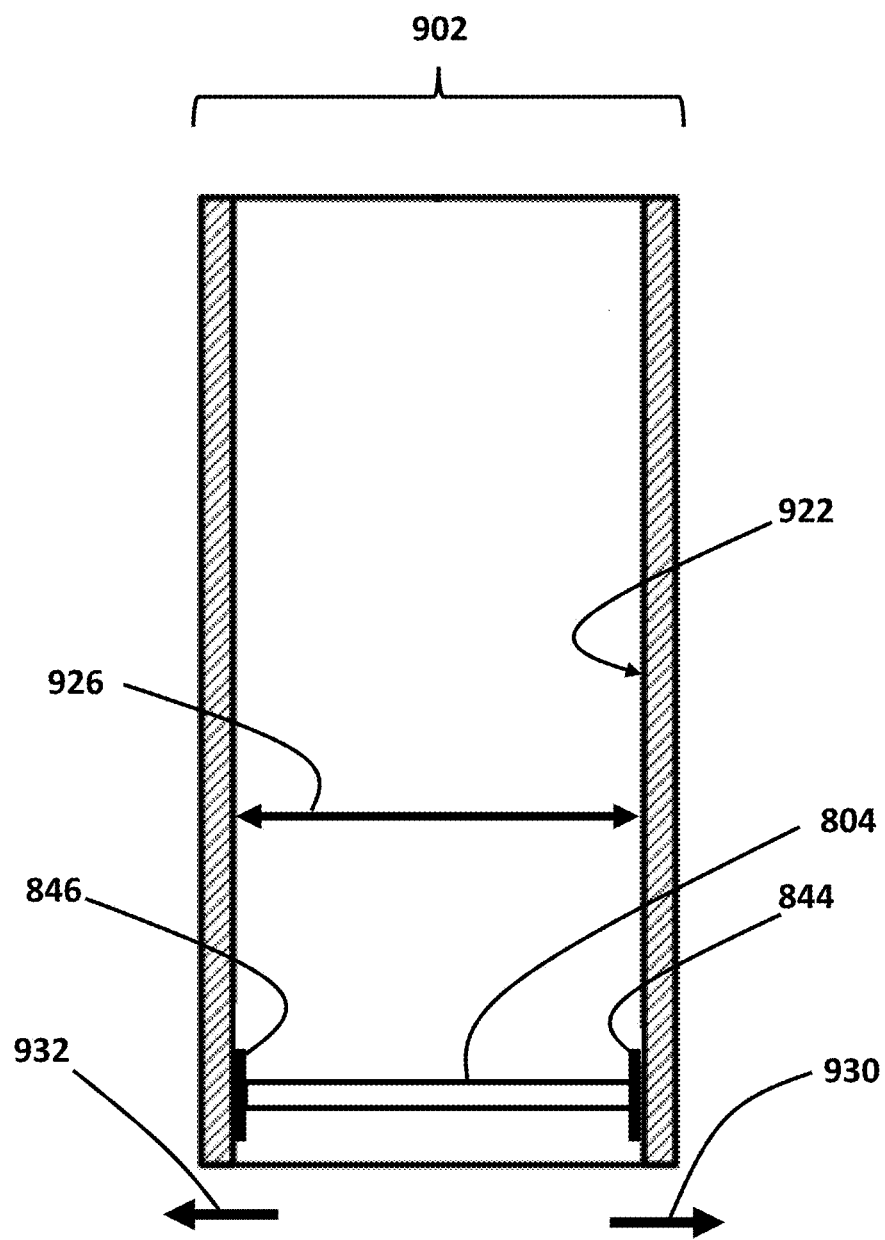
FIG. 9B illustrates a schematic view of an ovality compensation mechanism inside a pipe segment, consistent with one or more exemplary embodiments of the present disclosure.

In an exemplary embodiment, first end plate 844 may be configured to be in contact with an exemplary inner surface of an exemplary pipe segment and apply pressure to the inner surface of the pipe segment in a first direction. In an exemplary embodiment, second end plate 846 may be configured to be in contact with an inner surface of the pipe segment and apply pressure to the inner surface of the pipe segment in a second direction that may be opposite to the first direction. In an exemplary embodiment, exemplary first direction and exemplary second direction are explained in further detail with respect to FIG. 9B. FIG. 9B shows a schematic view of ovality compensation mechanism 804 inside a pipe segment 902, consistent with one or more exemplary embodiments of the present disclosure. As shown in FIG. 9B, in an exemplary embodiment, ovality compensation mechanism 804 may be disposed inside a pipe segment 902 in such a way that first end plate 844 and second end plate 846 are in contact with an inner surface 922 of pipe segment 902. In an exemplary embodiment, first end plate 844 may be configured to apply pressure to inner surface 922 of pipe segment 902 in first direction 930 and second end plate 846 may be configured to apply pressure to inner surface 922 of pipe segment 902 in second direction 932. In an exemplary embodiment, first direction 930 and second direction 132 may be perpendicular to vertical axis 807. In an exemplary embodiment, when second end plate 846 moves in first direction 930, first end plate 844 may apply pressure to inner surface 922 of pipe segment 902 in first direction 930 and second end plate 846 may apply pressure to inner surface 922 of pipe segment 902 in second direction 932 and, to thereby, a diameter 926 of pipe segment 902 may increase. In an exemplary embodiment, increasing a diameter 926 of pipe segment 902 may help compensating for ovality of pipe segment 902.

As further shown in FIG. 9A, in an exemplary embodiment, second arm 845 may include a hollow beam. In an exemplary embodiment, ovality compensation mechanism 804 may further include a moveable arm 847 which may be disposed slidably inside second arm 845. In an exemplary embodiment, when moveable arm 847 is disposed slidably inside second arm 845, it may mean that moveable arm 847 is disposed inside second arm 845 in such a way that moveable arm 847 is able to move linearly inside second arm 845 in first direction 930 or second direction 932. In an exemplary embodiment, second end plate 846 may be attached fixedly to a distal end 8474 of moveable arm 847. In an exemplary embodiment, ovality compensation mechanism 804 may further include a hydraulic jack 848. In an exemplary embodiment, hydraulic jack 848 may be disposed inside second arm 845. In an exemplary embodiment, hydraulic jack 848 may be connected to a proximal end 8472 of moveable arm 847. In an exemplary embodiment, hydraulic jack 848 may be configured to move moveable arm 847 back and forth inside second arm 845 in first direction 930 and/or second direction 932. In an exemplary embodiment, an exemplary operator may urge second end plate 846 to move in first direction 930 and/or second direction 932 by using hydraulic jack 848. In an exemplary embodiment, when an exemplary operator wants to attach a top rim of a pipe segment to a bottom rim of a pre-installed pipe segment by welding them to each other, the operator may first utilize ovality compensation mechanism 804 to change a diameter of the top rim of the pipe segment and then weld the top rim of the pipe segment to the bottom rim of the pre-installed pipe segment.

Figure 9C:
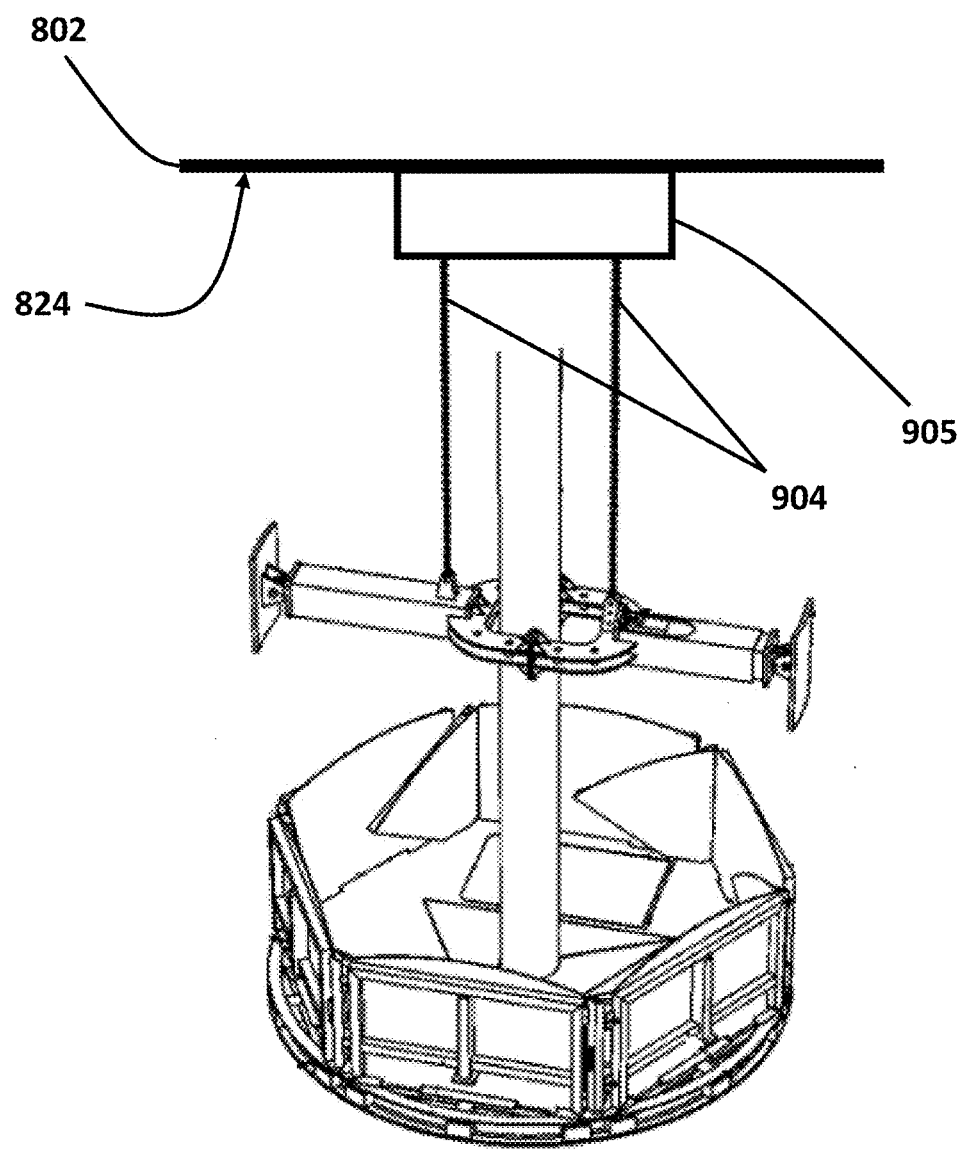
FIG. 9C illustrates a view of an ovality compensation mechanism, consistent with one or more exemplary embodiments of the present disclosure.

FIG. 9C shows a view of ovality compensation mechanism 804, consistent with one or more exemplary embodiments of the present disclosure. As shown in FIG. 9C, in an exemplary embodiment, base 842 may include a ring-shaped frame 8425 and a hole 8426 in ring-shaped frame 8425. In an exemplary embodiment, connecting rod 803 may be disposed inside hole 8426. As further shown in FIG. 9C, in an exemplary embodiment, system 800 may further include a couple of connecting chains 904 and a winch mechanism 905. In an exemplary embodiment, winch mechanism 905 may be attached to a lower side 824 of first floor 802. In an exemplary embodiment, lower side 824 of first floor 802 may refer to a side of first floor 802 that faces toward ground floor 801. In an exemplary embodiment, upper side 822 of first floor 802 may refer to a side of first floor 802 that does not face toward ground floor 801 and is opposite to lower side 824 of first floor 802. In an exemplary embodiment, couple of connecting chains 904 may be interconnected between ovality compensation mechanism 804 and winch mechanism 905. In an exemplary embodiment, winch mechanism 905 may be configured to move up and or move down ovality compensation mechanism 804. In an exemplary embodiment, an exemplary operator may utilize winch mechanism 905 to lower and/or raise ovality compensation mechanism 804 to place ovality compensation mechanism 804 at a desired location.

Figure 10:
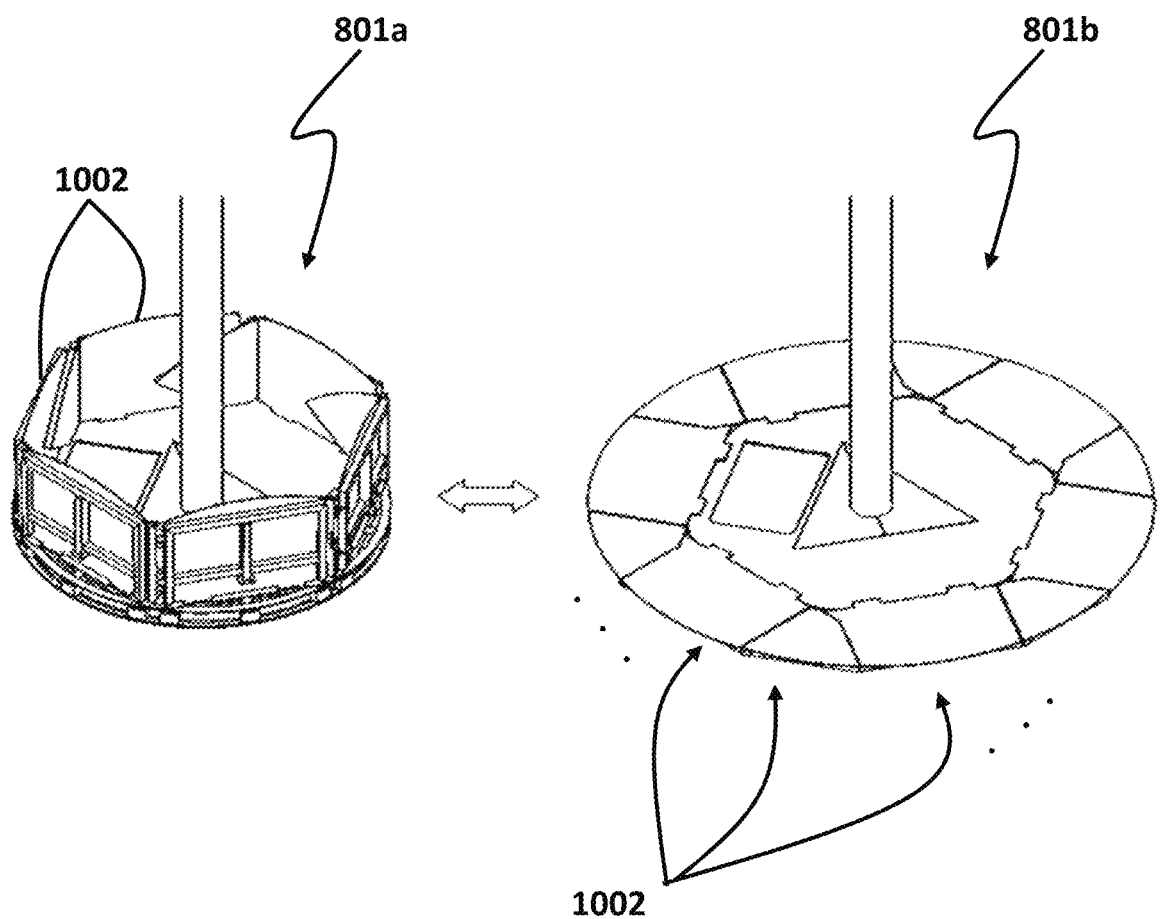
FIG. 10 illustrates a view of a ground floor in a closed position in an open position, consistent with one or more exemplary embodiments of the present disclosure.

FIG. 10 shows a view of ground floor 801 in a closed position 801a and in an open position 801b, consistent with one or more exemplary embodiments of the present disclosure. As shown in FIG. 10, in an exemplary embodiment, ground floor 801 may include a plurality of flaps 1002 pivotally attached around perimeter of ground floor 801. In an exemplary embodiment, when plurality of flaps 1002 are opened, ground floor 801 may be in open position 801b so that an exemplary operator may have more space to walk and therefore may have a better access to different parts of pipe segment 902. In an exemplary embodiment, plurality of flaps 1002 may be opened to extend the working area and provide a secure standing area for the personnel to perform modifying tasks on the pipe.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A system for transporting equipment and individuals within a conduit and/or a pipeline, the system comprising:
 a ground floor, the ground floor comprising a first circular disk, the ground floor configured to receive and keep an operator onto an upper side of the ground floor;
 a first floor, the first floor comprising a second circular disk, the first floor configured to receive and keep the operator onto an upper side of the first floor, a main plane of the ground floor being parallel to a main plane of the first floor;
 a connecting rod interconnected between the ground floor and the first floor, a first end of the connecting rod attached to a center of the upper side of the ground floor, a second end of the connecting rod attached to a center of the lower side of the first floor, a main longitudinal axis of the connecting rod perpendicular to the main plane of the ground floor and the main plane of the first floor;
 an ovality compensation mechanism attached to a lower side of the first floor by utilizing a couple of connecting chains, the ovality compensation mechanism configured to increase a diameter of a pipe segment of the pipeline, the ovality compensation mechanism comprises:

a base, the base comprising:
  a ring-shaped frame; and
  a hole in the ring-shaped frame, the connecting rod disposed inside the hole;
a first arm attached from a proximal end of the first arm to a first end of the base;
a first end plate fixedly attached to a distal end of the first arm, the first end plate configured to:
  be in contact with an inner surface of a pipe segment; and
  apply pressure to the inner surface of the pipe segment in a first direction;
a second arm attached from a proximal end of the second arm to a second end of the base, the second arm comprising a hollow beam;
a second end plate movably attached to a distal end of the second arm, the second end plate configured to:
  be in contact with the inner surface of the pipe segment; and
  apply pressure to the inner surface of the pipe segment in a second direction, the first direction opposite to the second direction;
a moveable arm, a proximal end of the moveable arm disposed slidably inside the second arm, the second end plate attached fixedly to a distal end of the moveable arm; and
a hydraulic jack disposed inside the second arm, the hydraulic jack connected to the proximal end of the moveable arm, the hydraulic jack configured to urge moveable arm to move linearly inside the second arm;
wherein responsive to moving the second plate in the second direction, the first end plate and the second end plate are configured to increase a diameter of the pipe segment by applying pressure to the inner surface of the pipe segment at opposite ends of the diameter of the pipe segment;
a couple of holding arms at a top end of the system, the couple of holding arms configured to be attached to a winch, the winch configured to ascend and/or descend the system within the conduit; and
a winch mechanism attached to the lower side of the first floor, the couple of connecting chains connected to the winch mechanism, the winch mechanism configured to move up and/or move down the ovality compensation mechanism along a vertical axis, the main longitudinal axis of the connecting rod coinciding the vertical axis.

2. A system for transporting equipment and individuals within a conduit and/or a pipeline, the system comprising:
  a ground floor, the ground floor comprising a first circular disk, the ground floor configured to receive and keep an operator onto an upper side of the ground floor;
  a first floor, the first floor comprising a second circular disk, the first floor configured to receive and keep the operator onto an upper side of the first floor;
  a connecting rod interconnected between the ground floor and the first floor;
  an ovality compensation mechanism attached to a lower side of the first floor by utilizing a couple of connecting chains, the ovality compensation mechanism configured to increase a diameter of a pipe segment of the pipeline; and
  a couple of holding arms at a top end of the system, the couple of holding arms configured to be attached to a winch, the winch configured to ascend and/or descend the system within the conduit.

3. The system of claim 2, wherein the ovality compensation mechanism comprises:
  a base;
  a first arm attached from a proximal end of the first arm to a first end of the base;
  a first end plate fixedly attached to a distal end of the first arm, the first end plate configured to:
    be in contact with an inner surface of a pipe segment; and
    apply pressure to the inner surface of the pipe segment in a first direction;
  a second arm attached from a proximal end of the second arm to a second end of the base; and
  a second end plate movably attached to a distal end of the second arm, the second end plate configured to:
    be in contact with the inner surface of the pipe segment; and
    apply pressure to the inner surface of the pipe segment in a second direction, the first direction opposite to the second direction,
  wherein responsive to moving the second plate in the second direction, the first end plate and the second end plate are configured to increase a diameter of the pipe segment by applying pressure to the inner surface of the pipe segment at opposite ends of the diameter of the pipe segment.

4. The system of claim 3, wherein:
  the second arm comprises a hollow beam; and
  the ovality compensation mechanism further comprises:
    a moveable arm, a proximal end of the moveable arm disposed slidably inside the second arm, the second end plate attached fixedly to a distal end of the moveable arm; and
    a hydraulic jack disposed inside the second arm, the hydraulic jack connected to the proximal end of the moveable arm, the hydraulic jack configured to urge moveable arm to move linearly inside the second arm.

5. The system of claim 4, further comprises a winch mechanism attached to the lower side of the first floor, the couple of connecting chains connected to the winch mechanism, the winch mechanism configured to move up and/or move down the ovality compensation mechanism along a vertical axis.

6. The system of claim 5, wherein the base comprises:
  a ring-shaped frame; and
  a hole in the ring-shaped frame, the connecting rod disposed inside the hole.

7. The system of claim 6, wherein a main plane of the ground floor is parallel to a main plane of the first floor.

8. The system of claim 7, wherein a main longitudinal axis of the connecting rod is perpendicular to the main plane of the ground floor and the main plane of the first floor.

9. The system of claim 8, wherein:
  a first end of the connecting rod is attached to a center of the upper side of the ground floor; and
  a second end of the connecting rod is attached to a center of the lower side of the first floor.

10. The system of claim 9, wherein the main longitudinal axis of the connecting rod coincides the vertical axis.

11. The system of claim 10, wherein
  the ground floor comprises a plurality of flaps pivotally attached around a perimeter of the ground floor;
  when the plurality of flaps are opened, the ground floor is in an opened position; and the opened position of the ground floor is configured to provide a working area and a secure standing area for an operator.

12. The system of claim 11, wherein the system further comprises:
a second floor disposed above the first floor;
a first ladder disposed between the first floor and the second floor;
a third floor disposed above the second floor;
a second ladder disposed between the second floor and the third floor;
an elevator disposed above the third floor; and
a third ladder disposed between the third floor and the elevator.

* * * * *